United States Patent
Dekel et al.

(10) Patent No.: US 12,476,957 B2
(45) Date of Patent: Nov. 18, 2025

(54) SYSTEM AND METHOD FOR PROVIDING MULTI FACTOR AUTHORIZATION TO RDP SERVICES THROUGH A ZERO TRUST CLOUD ENVIRONMENT

(71) Applicant: HEWLETT PACKARD ENTERPRISE DEVELOPMENT LP, Spring, TX (US)

(72) Inventors: Shachar Dekel, Tel Aviv (IL); Natan Elul, Tel Aviv (IL); Gil Azrielant, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 814 days.

(21) Appl. No.: 17/654,309

(22) Filed: Mar. 10, 2022

(65) Prior Publication Data

US 2023/0291726 A1   Sep. 14, 2023

(51) Int. Cl.
*H04L 9/40* (2022.01)
*H04L 67/1008* (2022.01)

(52) U.S. Cl.
CPC ........ *H04L 63/083* (2013.01); *H04L 63/0861* (2013.01); *H04L 63/107* (2013.01); *H04L 67/1008* (2013.01); *H04L 2463/082* (2013.01)

(58) Field of Classification Search
CPC . H04L 63/083; H04L 63/0861; H04L 63/107; H04L 67/1008; H04L 2463/082
See application file for complete search history.

(56) References Cited

U.S. PATENT DOCUMENTS

| | | |
|---|---|---|
| 9,148,405 B2 | 9/2015 | Narendra et al. |
| 11,240,242 B1* | 2/2022 | Celik .................. H04L 12/4633 |
| 11,444,925 B1* | 9/2022 | Patimer ................. H04L 67/147 |
| 11,470,100 B1 | 10/2022 | Christian |
| 11,716,312 B1 | 8/2023 | Mcnamara, Jr. |
| 12,184,696 B2 | 12/2024 | Subbanna et al. |
| 2010/0146611 A1* | 6/2010 | Kuzin ................. H04L 63/0815 726/8 |
| 2015/0382195 A1 | 12/2015 | Grim et al. |
| 2017/0331832 A1 | 11/2017 | Lander et al. |
| 2018/0295137 A1 | 10/2018 | Zager et al. |
| 2019/0068578 A1 | 2/2019 | Balakrishnan et al. |
| 2019/0081942 A1 | 3/2019 | Suresh |
| 2019/0141015 A1 | 5/2019 | Nellen |
| 2020/0236112 A1 | 7/2020 | Pularikkal et al. |

(Continued)

OTHER PUBLICATIONS

International Search Report for PCT Application PCT/IB2023/052327 dated Jun. 13, 2023. The International Bureau of WIPO.

(Continued)

*Primary Examiner* — Kristie D Shingles
(74) *Attorney, Agent, or Firm* — Hewlett Packard Enterprise Patent Department

(57) ABSTRACT

Remote desktop protocol (RDP) is a proprietary protocol for controlling machines over a network. In order to overcome certain deficiencies of the protocol a method is disclosed utilized in a zero trust cloud environment, to provide access to a RDP servers utilizing multifactor authorization services which are not natively supported by RDP. This is performed utilizing an RDP client while simultaneously providing an authenticated and secure policy based experience through a zero trust network.

19 Claims, 5 Drawing Sheets

(56) References Cited

U.S. PATENT DOCUMENTS

| | | | |
|---|---|---|---|
| 2020/0336466 | A1 | 10/2020 | Goldschlag et al. |
| 2021/0092200 | A1 | 3/2021 | Chauhan et al. |
| 2021/0136041 | A1 | 5/2021 | Foxhoven et al. |
| 2021/0250333 | A1 | 8/2021 | Negrea et al. |
| 2022/0075889 | A1 | 3/2022 | Friedman |
| 2022/0353244 | A1* | 11/2022 | Kahn .................. H04L 67/12 |
| 2023/0123781 | A1* | 4/2023 | Kaimal ................ H04L 67/141 |
| | | | 726/12 |
| 2023/0164183 | A1 | 5/2023 | Kothari et al. |
| 2023/0224167 | A1 | 7/2023 | Wang et al. |
| 2023/0370495 | A1* | 11/2023 | Desai .................. H04L 63/1425 |
| 2023/0412638 | A1* | 12/2023 | Dogaru ............... H04L 63/0236 |
| 2024/0121211 | A1 | 4/2024 | Bhatia et al. |
| 2024/0129338 | A1 | 4/2024 | Azad et al. |

OTHER PUBLICATIONS

Written Opinion of the International Searching Authority for PCT Application PCT/IB2023/052327 dated Jun. 13, 2023. The International Bureau of WIPO.

\* cited by examiner

SYSTEM AND METHOD FOR PROVIDING MULTI FACTOR AUTHORIZATION TO RDP SERVICES THROUGH A ZERO TRUST CLOUD ENVIRONMENT

TECHNICAL FIELD

The disclosure generally relates to remote desktop access, and particularly improved techniques for providing remote desktop access.

BACKGROUND

Remote desktop protocol (RDP) is a communication protocol for controlling another machine over a network connection. A client running client software (or in some instances web interface) connects to a server running server software, which allows the client to control the server. RDP is a proprietary protocol developed by Microsoft® and is widely in use in network and cloud environments.

As is often with proprietary protocols, customizing the protocol for a user's needs is not often straightforward. Further, certain functionalities may be totally absent, leaving a user to either find a workaround, look for an alternative solution, or simply wait until such time as the owner of the proprietary protocol decides to produce a new version.

For example, RDP allows features network level authentication (NLA) but does not support multi factor authorization (MFA). Thus, the level of security provided by this proprietary protocol is limited to what the proprietor decides to provide.

It would therefore be advantageous to overcome at least the challenges noted above, and further provide improvements on techniques for providing RDP access to machines.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing a multifactor authentication (MFA) service for an RDP (remote desktop protocol) session through a zero trust cloud environment. The method comprises: authenticating an identity of a user account, wherein the user account provided a request through a client device to connect to the zero trust cloud environment; receiving a request from the client device to connect to a target machine having an RDP server; generating an MFA challenge for the client device; and initiating a primary RDP session through the zero trust cloud environment with the target machine, in response to determining that the MFA challenge is successfully completed.

Certain embodiments disclosed herein also include a non-transitory computer readable medium having stored thereon causing a processing circuitry to execute a process, the process comprising: authenticating an identity of a user account, wherein the user account provided a request through a client device to connect to the zero trust cloud environment; receiving a request from the client device to connect to a target machine having an RDP server; generating an MFA challenge for the client device; and initiating a primary RDP session through the zero trust cloud environment with the target machine, in response to determining that the MFA challenge is successfully completed.

Certain embodiments disclosed herein also include a system for providing a multifactor authentication (MFA) service for an RDP (remote desktop protocol) session through a zero trust cloud environment. The system comprises: a processing circuitry; and a memory, the memory containing instructions that, when executed by the processing circuitry, configure the system to: authenticate an identity of a user account, wherein the user account provided a request through a client device to connect to the zero trust cloud environment; receive a request from the client device to connect to a target machine having an RDP server; generate an MFA challenge for the client device; and initiate a primary RDP session through the zero trust cloud environment with the target machine, in response to determining that the MFA challenge is successfully completed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
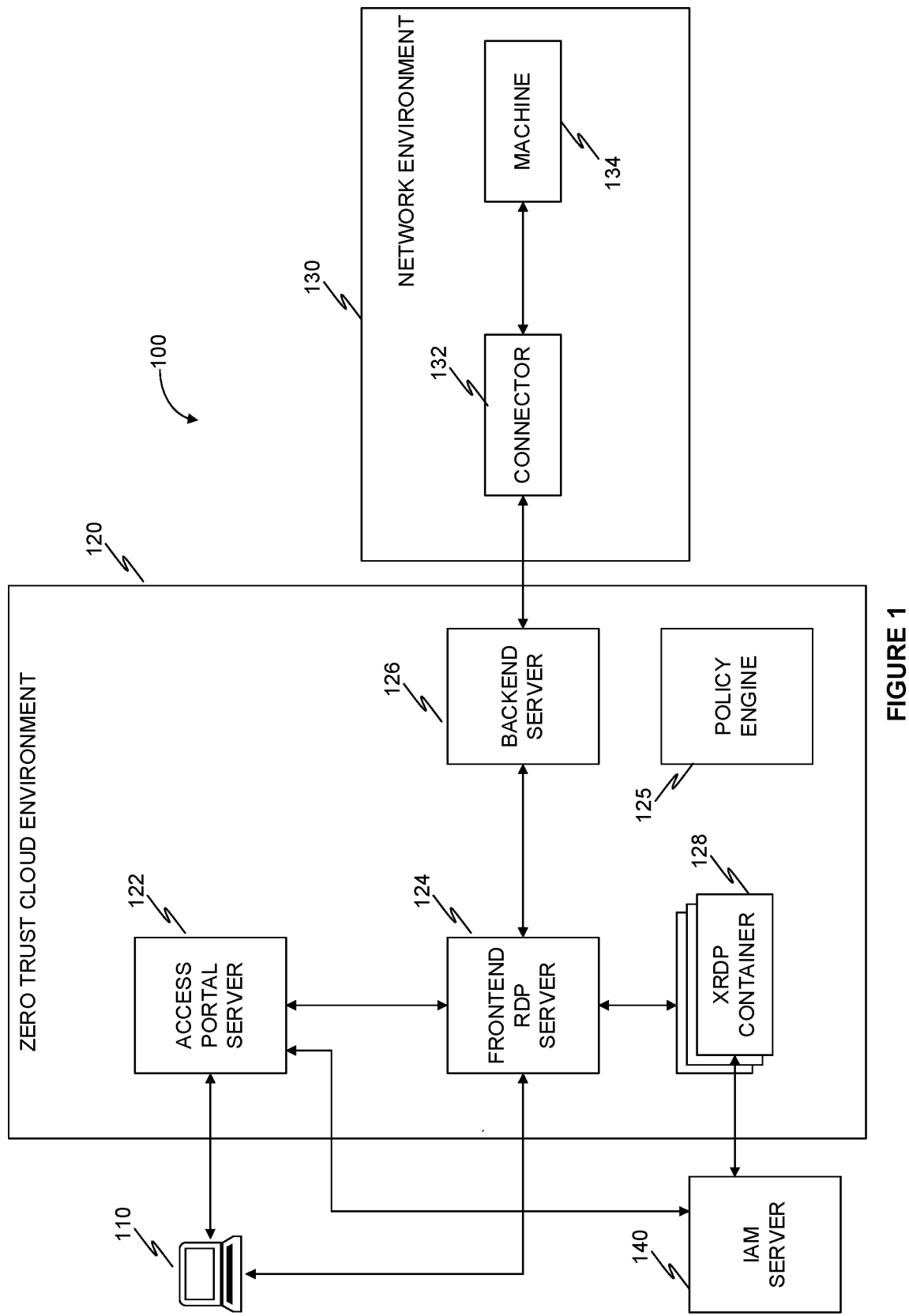
FIG. 1 is a network diagram of a zero trust network architecture for providing an RDP service with multifactor authentication, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Remote desktop protocol (RDP) is a proprietary protocol for controlling machines over a network. In order to overcome certain deficiencies of the protocol a method is disclosed utilized in a zero-trust cloud environment, to provide access to a RDP servers utilizing multifactor authorization services which are not natively supported by RDP. This is performed utilizing an RDP client while simultaneously providing an authenticated and secure policy based experience through a zero trust network.

FIG. 1 is a network diagram of a zero-trust network architecture 100 for providing an RDP service with multifactor authentication (MFA), implemented in accordance with an embodiment. A client device 110 is operative for communicating over a network (not shown) with an access portal server 122, and a frontend RDP server 124, implemented in a first cloud environment 120. A client device 110 may be a personal computer, a smart phone, a tablet, and the like. The client device 110 may run an RDP client (which is an application executed on the client device), or in another embodiment may access RDP services through a web browser, for example, utilizing an IIS (Internet Information Services) server. The first cloud environment 120 is a computing environment for providing services utilizing a zero-trust architecture. Hereinafter the first cloud environment 120 may be referred to as a zero-trust cloud environment. The first cloud environment 120 may be implemented on one or more cloud infrastructure technologies, such as Microsoft® Azure, Google® Cloud Platform (GCP), Amazon® Web Services (AWS) and the like.

Establishing a connection between the client device 110 and the frontend RDP server 124 may be performed by an RDP client application, or by web based access. An RDP client based connection requires an RDP client application to be installed on the client device 110. For example, the client device 110 may request a connection with the access portal 122. The access portal 122 requests identifying credentials from the client device 110. In an embodiment the client device 110 may utilize an identity access management (IAM) service, for example from IAM server 140, in order to verify the user account which is requesting access via the client device 110. For example, Okta™ may provide identity and access management services as a third-party application.

In such an embodiment, the third party application may request a second form of identification, such as sending a code to a mobile phone associated with the user account, or requesting a personal identity number (PIN) generated by an RSA token. In an embodiment the IAM server 140 may be implemented in the first cloud environment 120. The client device 110 may provide the access portal server 122 with login credentials, such as username and password.

After verifying the identity of the user account, the access portal server 122 may provide the client device 110 with an RDP file (.rdp) which includes therein an address or server name to connect to, a port, token, token version, token type, and the like. A token may be a unique ID which is associated with a user account, tenant, or combination thereof. In certain embodiments a token expiry time may be specified. A token type may be a file token, or session token. In certain embodiments the token version may indicate an expiry time. In other embodiments the token is stored, for example in a storage of the frontend RDP server 124, together with a date. The frontend server may determine that a token is expired based on the date, or timestamp.

For example, the frontend RDP server 124 may include a policy which defines tokens as expired after a predetermined period of time has lapsed. In some embodiments, the predetermined period of time may be relative to a last time in which the user account was verified. In an embodiment, a policy may be used to define if a session is inactive for a predetermined period of time then the last time a user account was verified may be longer than that period of time, and therefore considered no longer valid. For example, a policy engine 125 may store policies thereon. The frontend RDP server 124 may query the policy engine 125 to determine if a policy exists for a user (for example based on a user role, username, domain name, or other information associated with a user account).

When a token is found to be expired, the frontend RDP server 124 may deny the connection, or, in other embodiments, direct the session to a designated XRDP container, such as container 128. The XRDP container 128 may be used to reauthenticate (or authenticate, if authentication failed for other reasons) the user credentials. The XRDP container 128 may provide a user interface, for example by connecting to the access portal server 122 for performing the multi factor authentication. The access portal server 122 may communicate with the IAM server 140 to provide third party authentication. Once authenticated (i.e., the IAM server 140 provides confirmation that the user account is authenticated) the access portal server 122 may update the frontend RDP server 124 that the user account is authenticated, and the frontend RDP server 124 may then initiate a reconnect in response to determining that the user account has been authenticated.

In an embodiment, the policy engine 125 may determine that a user account is associated with an MFA requirement. The frontend RDP server 124 may initiate a connection to an XRDP container 128, which is configured to display, for example on a web browser, a user interface into which additional login credentials may be entered. Upon determination of the policy engine 125 that the username (or user account) is associated with a policy requiring additional authentication, an XRDP container 128 may be spun up (for example as a node in a Kubernetes® cluster), which is configured to provide a user interface for receiving additional authentication information.

In an embodiment, the XRDP container 128 may provide a token to the access portal server 122 in order to determine if the token associated with the user account is valid. If the token is invalid (e.g., expired), the access portal server 122 may determine what type of IAM challenge to provide to the XRDP container 128. In certain embodiments the IAM challenge may be provided from an internal IAM server (not shown). In other embodiments the IAM challenge may be provided from an external IAM server 140.

In an embodiment, the frontend server 124 (or access portal server 122, or XRDP container 128) may request from the IAM server 140 an HTML frame including code that when executed by a web browser of the XRDP container 128 displays a user interface for entering additional authentication information. The additional information may be, for example, a request to input a code sent to another used device previously confirmed for the username (such as code received through a mobile phone short message service), a request to answer one or more security questions which the user previously provided answers to, and the like. In an embodiment, a policy may be configured to periodically generate requests for authentication. For example, after 15 minutes of inactivity, the policy requires that the user reauthenticate with a username and password, and after 60 minutes of inactivity the policy requires that the user reauthenticate with MFA.

The RDP file may be generated based on one or more policies which can be stored in a storage (not shown) of the frontend RDP server 124. In other embodiments, the policy may be stored on a policy server, implemented as a virtual workload or physical workload in the cloud environment

120. The RDP file may configure the client device 110 to initiate an RDP session with a frontend server 124.

Upon connecting the client device 110 to the frontend RDP server 124 utilizing the client RDP application, the frontend RDP server 124 may determine if user credentials are further required. If yes, the frontend RDP server 124 is configured to designate a connection to another machine in order to capture login credentials for the designated machine. For example, the frontend server 124 may initiate a container 128 running a Linux OS with an XRDP application. In an embodiment, the frontend server 124 may instruct a serverless function to spin up an XRDP container for each login instance of a user.

The XRDP container 124 provides an isolated environment for each user, in which login credentials of the user may be captured. The login credentials may include a username and password of the machine which the user wishes to connect to, username and password for a domain, authentication token, and so on. The XRDP container 124 may be used for other interactions with the client device 110, and may be used to improve user experience by providing and requesting additional information, rendering information pages, and the like.

In an embodiment, the XRDP container 124 may provide a user with a browser client and directed to a web page rendered by the access portal server 122 which provides a form in which to enter the login credentials. The access portal server 122 may provide the login credentials to the frontend server 124 which may use the login credentials to determine if the user is authorized to log in to the machine, which is the target RDP server (i.e., the machine to which the client wishes to connect to). In an embodiment the login credentials may be operating system (e.g., Microsoft Windows®) credentials, which may be different than credentials used for authentication with the zero-trust cloud environment 120.

In certain embodiments, the zero-trust cloud environment 120 may store login credentials, which the zero trust cloud environment 120 may encrypt, in order to use the login credentials for future sessions, thus reducing the need for capturing login details, for example by using the XRDP container. The login credentials may be stored for example by the frontend RDP server 124 in a storage device (not shown).

In some embodiments, a static set of credentials (e.g., a username, a password, a domain name, or combination thereof) is stored in the zero-trust cloud environment, utilized for any user that has access (for example based on a policy) to a configured RDP application. For example, the static set of credentials may be stored in a storage of the access portal server 122, the policy engine 125, and the like. The user selects the RDP application from the access portal server GUI, then a client device thereof executes the .rdp file. The frontend RDP server 124 is configured to use the static set of credentials without revealing them to the user, and connects the user to the target server. This is advantageous, for example, to allow third parties access a specific RDP resource within the secure network without generating, or revealing, a dedicated windows user which is configured in the secure network active directory.

For example, a backend server 126 may communicate with a connector 132, which is implemented in the secure network environment 130 of the machine 134. The secure network environment 130 may be a secure network into which it is desired to provide controlled access to certain machines. The connector 132 is configured to communicate with a machine 134, which a user device is attempting to access. In an embodiment, a plurality of connectors, each deployed in a secure network environment, each communicate with one of a plurality of backend servers.

In response to determining that the login credentials allow the user device 110 to connect to the machine 134, the frontend server 124 injects a reconnect packet to the communication session between the user device 110 and the XRDP container 128. The reconnect packet configures the user device 110 to end the current RDP session between the client device and the XRDP container, and reconnect with a new session token to the frontend server 124. The frontend server 124 uses the login credentials provided by the client device 110 to the XRDP container 128 in order to access the machine 134.

The communication path between the user device 110 and machine 134 includes the frontend server 124, the backend server 126, and connector 132. In an embodiment a first token (authentication token) may be used for authenticating the client with the frontend RDP server 124 via the access portal server 122, and a second token (session token) may be used for connecting the client device 110 to the frontend RDP server 124 when providing a connection to the target RDP server (i.e., machine 134).

RDP is generally a protocol which does not support an entity in the middle of communication. However, by utilizing the zero-trust cloud architecture described herein the client device is able to access a resource, in this case machine 134 in the secure network environment 130, while the connection is monitored, authenticated and verified by the first cloud environment 120. Such capabilities are not native to RDP and may be advantageous to have. Moreover, various forms of functionality can be implemented on top of this architecture to provide additional benefits for such a controlled access environment.

Figure 2:
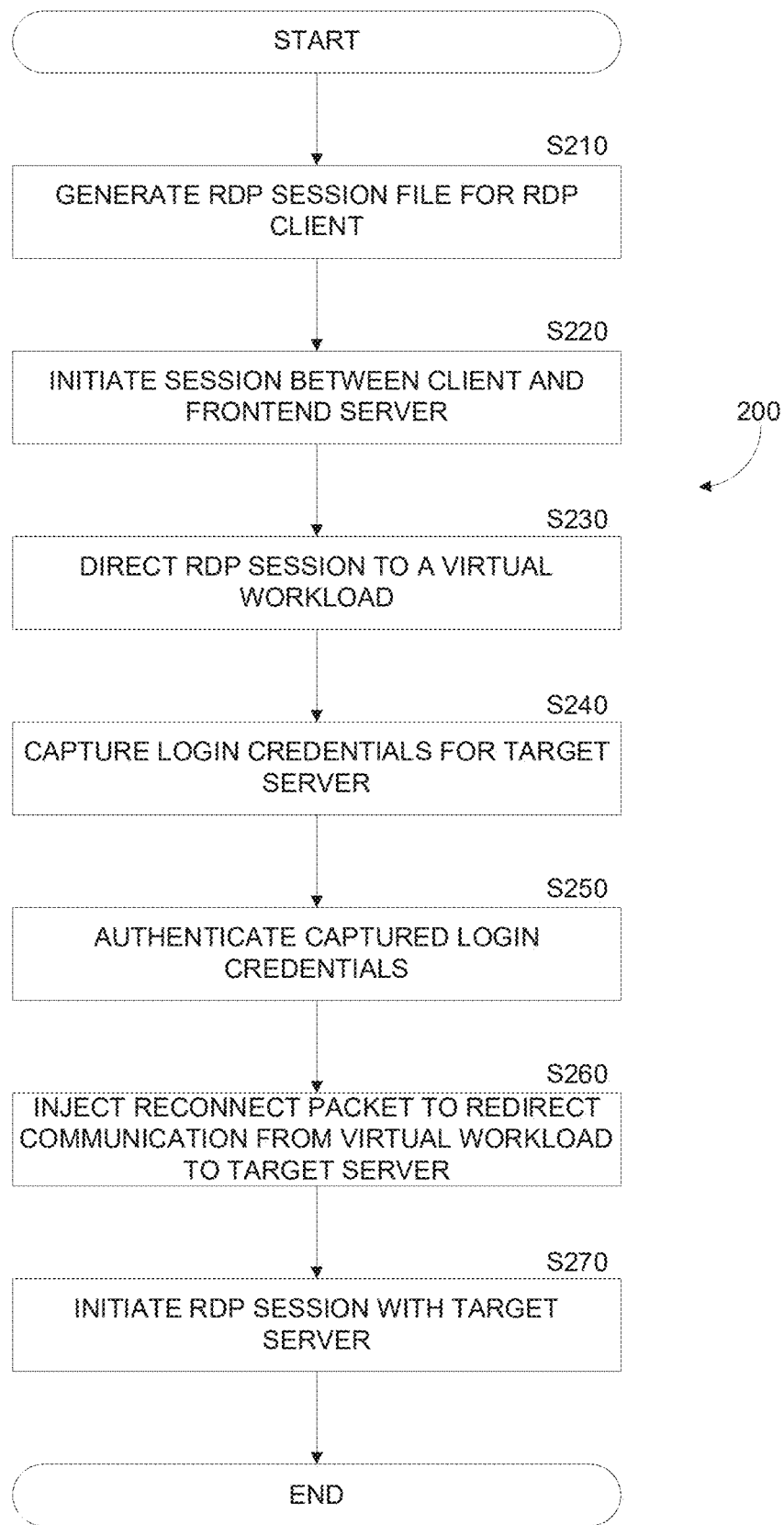
FIG. 2 is a flowchart a method for an RDP client based connection between a client device and a server utilizing RDP in a zero trust environment, implemented in accordance with an embodiment.

FIG. 2 is an example flowchart 200 of a method for an RDP client-based connection between a client device and a server utilizing RDP through a zero-trust environment, implemented in accordance with an embodiment.

At S210, an RDP session file is generated for a client. The RDP session file may be a textual file which includes information which can be extracted by the client device, having an RDP client. The extracted information allows the RDP client to initiate an RDP session with an RDP frontend server. The extracted information may be, for example, a server name, server address, network path, port, token, token version, token type, expiry, etc.

In an embodiment, the RDP session file is generated based on a request initiated by the client device to connect to a remote machine (i.e., the target server) in a secure network environment through an intermediary cloud environment (such as cloud environment 120).

At S220, a zero trust RDP session is initiated between the RDP client and an RDP frontend server, utilizing the RDP session file. The RDP session file may designate a target machine. In an embodiment the RDP client may render a user interface on the client device to capture login details of the target machine.

At S230, a virtual workload is spun up, to which the zero trust RDP session is directed. In an embodiment, the virtual workload is implemented as a container, for example utilizing XRDP. Directing the zero trust RDP session to an XRDP container may include generating an instruction for the frontend RDP server to forward network traffic from the client device to the XRDP container, and forward network traffic from the XRDP container to the client device.

At S240, user login credentials are captured, which are used for verification of a user identification with a target server. In an embodiment, the virtual workload may execute a web browser, which is predefined to access a URL directed to an access portal server. The access portal server provides the web browser with a web page which is used to capture login credentials.

At S250, the captured user login credentials are used to authenticate with a remote machine (i.e., target server). The user login credentials may be sent from the XRDP container to the frontend RDP server, which in turn validates them against the target server through a connection established by the backend server and connector. Thus, the frontend server is able to comply with the network level authentication (NLA) requirement of the RDP protocol.

At S260, a reconnect packet is injected in the communication to the client device. The reconnect packet instructs the client device to reconnect to the frontend RDP server with a new session, the new session directed to the target server, whereas the previous session was directed to the XRDP container (i.e., virtual workload). In an embodiment the reconnect packet is an instruction sent to the client device to close the current RDP connection and initiate a new connection immediately with updated information, the updated information including the target server, which replaces the XRDP container. In certain embodiments the updated information of the reconnect packet may further include an updated token which indicates to the frontend RDP server that the client device has provided login credentials which were successfully used to connect to the target server. The reconnect packet may be implemented as: RDP_SERVER_REDIRECTION_PACKET packet in RDP protocol.

At S270, an RDP session is initiated with the target server. The frontend RDP server is able to monitor the communication between the client device and the target server, as communication is passed between the target server and the client device via the frontend RDP server.

The frontend RDP server is thus configured to provide the client device with an RDP session to the target server, with the frontend RDP acting as a proxy. Providing an RDP session in this manner allows the frontend RDP server to authenticate the user of the client device (as implicated by the zero-trust environment) and also allows the frontend RDP server to monitor communication between the client device and the target server, since all communication flows from the client device to the frontend RDP server, and from there to the target server via the backend server and connector. This method overcomes the restriction placed by NLA, which is that authentication is done prior to establishing a session with the target server. The frontend RDP server is able to impersonate the client device (since it has the login credentials of the client), and thus can read any data packet transferred in the communication line.

Figure 3:
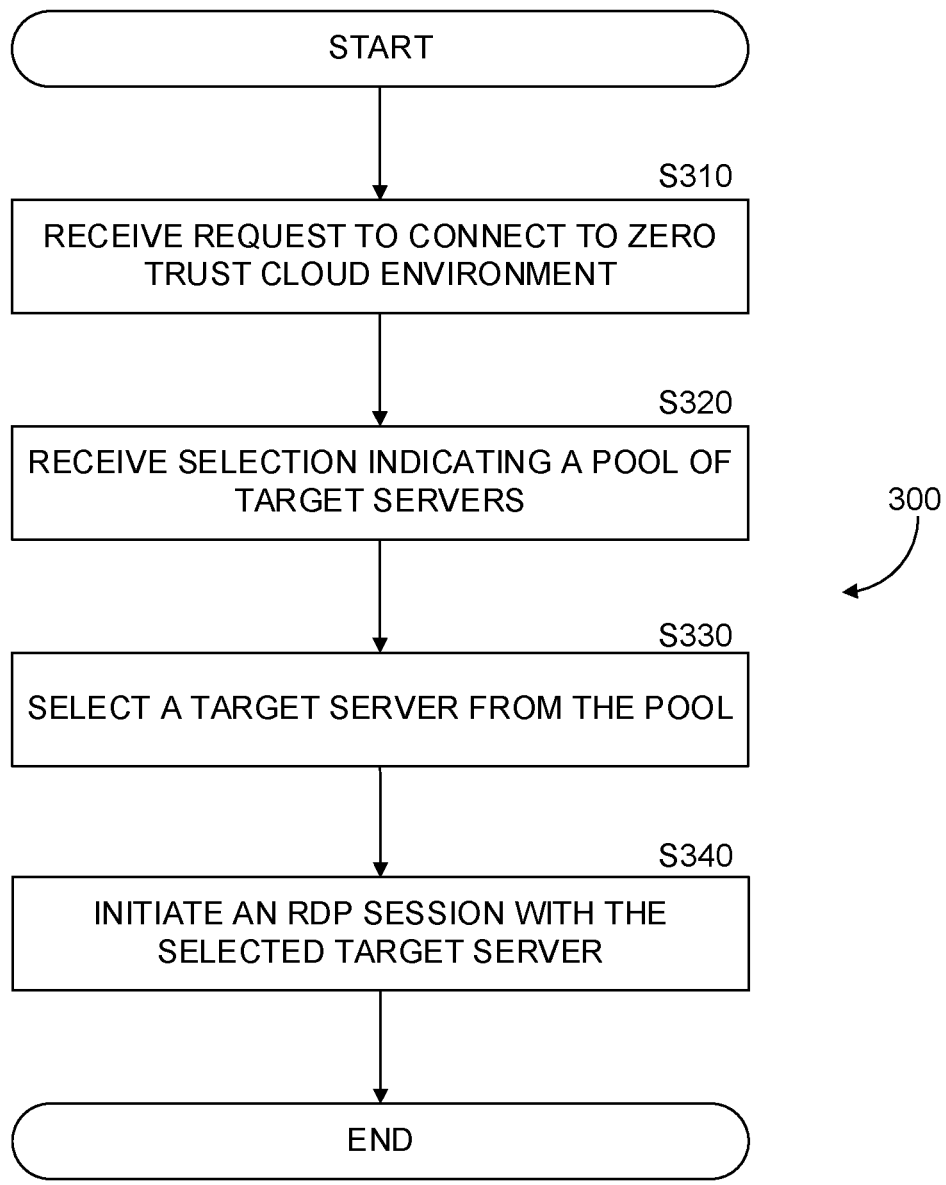
FIG. 3 is a flowchart of a method for providing a client device access to an RDP server pool, implemented in accordance with an embodiment.

FIG. 3 is an example flowchart 300 of a method for providing a client device access to an RDP server pool, implemented in accordance with an embodiment. Providing access to an RDP server pool may be advantageous for example in situations where the user is not necessarily interested in a specific machine, as much as they are interested in logging in to a particular network, or accessing an application which may be available on any one of many such machines.

At S310, a request is received to connect to a zero-trust cloud environment. The request may be received through an access portal server from a client device, wherein the access portal server generates instructions to render a graphical user interface (GUI) for identity verification. In an embodiment the GUI may further include, in response to successfully completing identity verification, an interface through which a user can provide a selection from a group of target servers to which to initiate an RDP session.

At S320, a selection is received which indicates a group of target servers. In an embodiment, a GUI may represent a group of target servers, for example, by rendering an icon which names a specific application executed on top of each of the target servers. By selecting the icon, for example by clicking on it, the user indicates that they wish to access the application hosted on any of the target servers. The group of target servers may also be referred to as a server pool, and in the case of RDP servers, an RDP server pool.

At S330, a target server is selected from the group of target servers. In an embodiment, selection may be performed by the access portal server, the frontend RDP server, or a load balancer implemented in the zero trust cloud environment.

At S340, an RDP session is with the selected target server. The RDP session may be initiated for example utilizing the RDP client application-based method described above with respect to FIG. 2. In certain embodiments, the session may include a multifactor authentication challenge, such as detailed herein.

Figure 4:
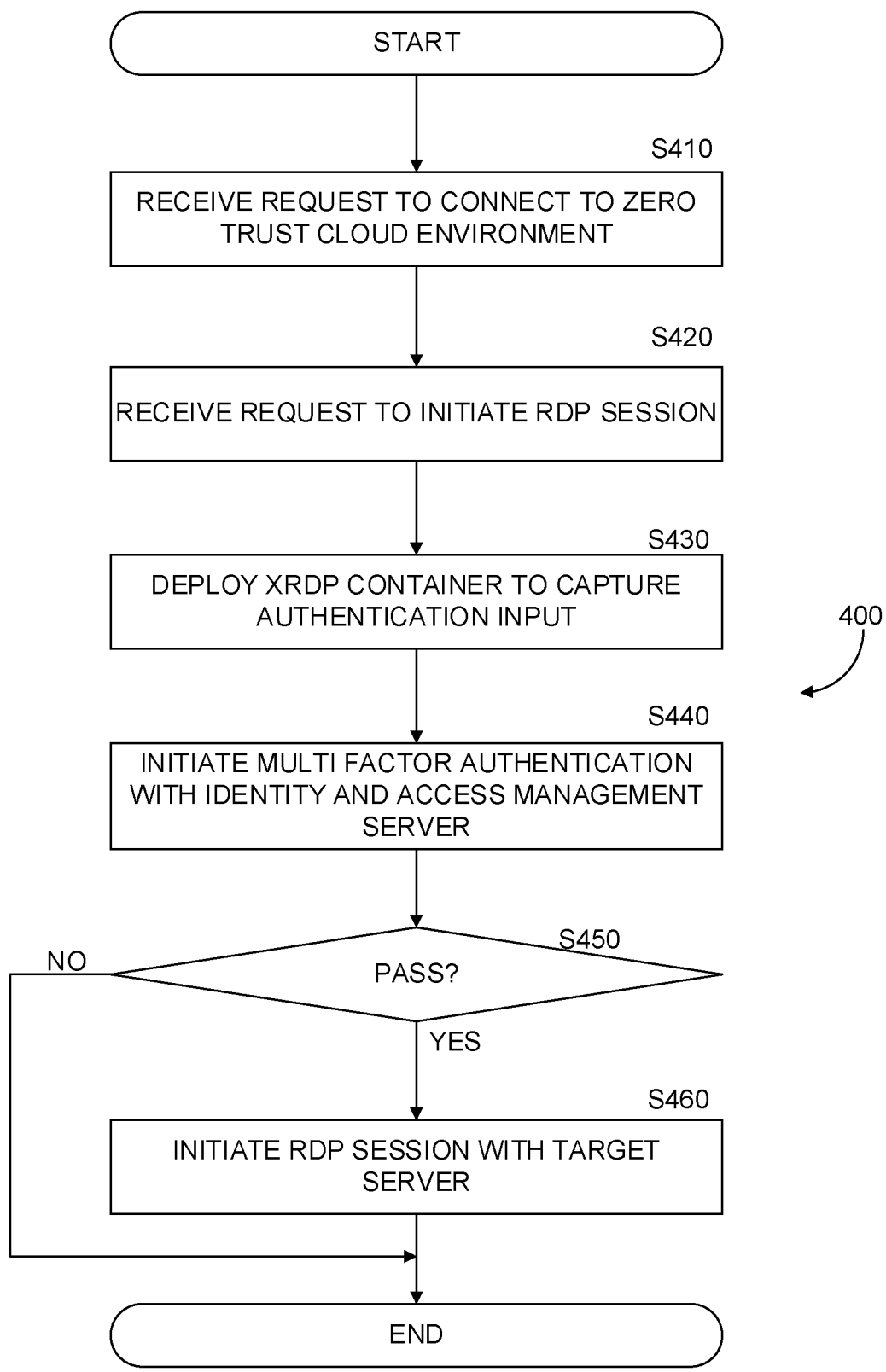
FIG. 4 is a flowchart of a method for providing RDP service with multifactor authentication (MFA) through a zero trust cloud environment, implemented in accordance with an embodiment.

FIG. 4 is an example flowchart 400 of a method for providing RDP service with multifactor authentication (MFA) through a zero-trust cloud environment, implemented in accordance with an embodiment. The RDP protocols do not natively support MFA, meaning that it is not possible to use multifactor authorization to authenticate an RDP session. However, by providing the RDP session through a zero-trust environment, for example as illustrated above in FIGS. 2-3, MFA capabilities may be added on top of the RDP session, which provides for increased security, which is otherwise not available when using this protocol as it is intended.

At S410, a request is received to connect to a zero-trust cloud environment. The request may be received through an access portal server from a client device, wherein the access portal server generates instructions to render a graphical user interface (GUI) for identity verification. In an embodiment the GUI may further include, in response to successfully completing identity verification, an interface through which a user can provide a selection from one or more target machines to which to initiate an RDP session. Based on a selection from the user, an RDP client-based session may be initiated, or a web-based RDP session may be initiated instead.

At S420, a request to initiate an RDP session is received. In an embodiment, the request may include a selection of a target machine with which to initiate the RDP session. The request may further provide login credentials for a machine, which can be used by a frontend RDP server to initiate an RDP session with the target machine.

At S430, an XRDP container is deployed to capture authentication input. The RDP session may be directed to the XRDP container. In an embodiment directing includes generating an instruction for the frontend RDP server to forward network traffic from the client device to the XRDP container, and forward network traffic from the XRDP container to the client device.

At S440, a multifactor authentication (MFA) challenge is generated. The MFA challenge may be generated by sending a request to an IAM service provider, such as Okta™, Google® Authenticator, Authy, Auth0, and the like. The request may be sent from the XRDP container, a frontend RDP server, and an access portal server. The MFA challenge may be generated based on a policy received from a policy engine. For example, a frontend RDP server (or e.g., access portal server, or XRDP container) may query a policy engine by providing a username of a user account to determine if one or more policies apply to the user account. A policy may be a conditional statement which instructs the frontend RDP server how, and how often, to initiate authentication using MFA for the user of the user account.

An MFA challenge may be generated based on a physical object such as a security token, bank card, key card, and the like; knowledge the user possesses, such as a password, PIN, and the like; a biometric such as fingerprints, voice prints, and the like; and a location of the user device, for example by geolocating an IP address used by the user device. The MFA challenge may be provided to the user device, for example, by rendering a user interface into which the user can supply additional credentials (or MFA response) required by the MFA challenge. The user interface may be rendered using a virtual workload, such as the XRDP container, having a web browser which displays a web page rendered by an access portal server into which a user may provide input (i.e., the MFA response).

In an embodiment, the frontend RDP server may send the user device a reconnect packet to divert (reconnect) the RDP session to a virtual workload (e.g., the XRDP container), and then divert the RDP session back to the target machine by sending another reconnect packet, in response to receiving an indication that the MFA challenge was successfully completed.

In certain embodiments, the frontend RDP server may send a request to an IAM service provider to provide the MFA challenge, and send the MFA response received from the user device to the IAM service provider. The IAM service provider may send an indication that the challenge was completed successfully or unsuccessfully. If the challenge is completed unsuccessfully, the frontend RDP server may determine if another MFA challenge should be provided, or for example if the user device should be disconnected from the zero-trust cloud environment. In an embodiment, determination may be further performed based on a policy received from the policy engine. For example, a policy may condition that a user account may fail an MFA challenge no more than 2 consecutive times, and user accounts which exceed this predetermined threshold are logged off (i.e., disconnected) from the zero-trust cloud environment.

At S450, a check is performed to determine if the MFA challenge was passed or failed. If the user device provided an MFA response which results in a pass execution continues at S560. Otherwise, execution may terminate. In another embodiment, if the MFA response results in a fail of the MFA challenge execution may continue at S540 with another MFA challenge presented, which may be the same challenge presented before, the same type of challenge, a different challenge, and a different type of challenge. In certain embodiments, the check is further performed based on a policy.

At S460, an RDP session is initiated with the target machine. In certain embodiments the RDP session is initiated between the frontend RDP server and the target machine prior to the MFA challenge, and in such embodiments a connection is initiated between the client device and the target machine only once the MFA challenge is passed. For example, the frontend RDP server only sends the reconnect instruction to the client device to direct communication from the XRDP container to the target machine once the MFA challenge is complete. The RDP session may be initiated by a frontend RDP server as discussed throughout this disclosure. The RDP session is initiated in response to successfully completing the MFA challenge. In certain embodiments, the frontend RDP server may periodically provide an MFA challenge to the client device, for example based on a requirement of a policy. The MFA challenge may be provided during an RDP session periodically and seamlessly in terms of the user experience. For example, the frontend RDP server may send a reconnect packet to the client device to direct the RDP session to an XRDP container through which an MFA challenge is presented.

In response to successfully completing the MFA challenge (i.e., providing an appropriate MFA response) the frontend server may send a second reconnect packet which directs the RDP session from the XRDP container to the target machine. This process can be repeated multiple times in what, for a user, seems like a single RDP session.

Figure 5:
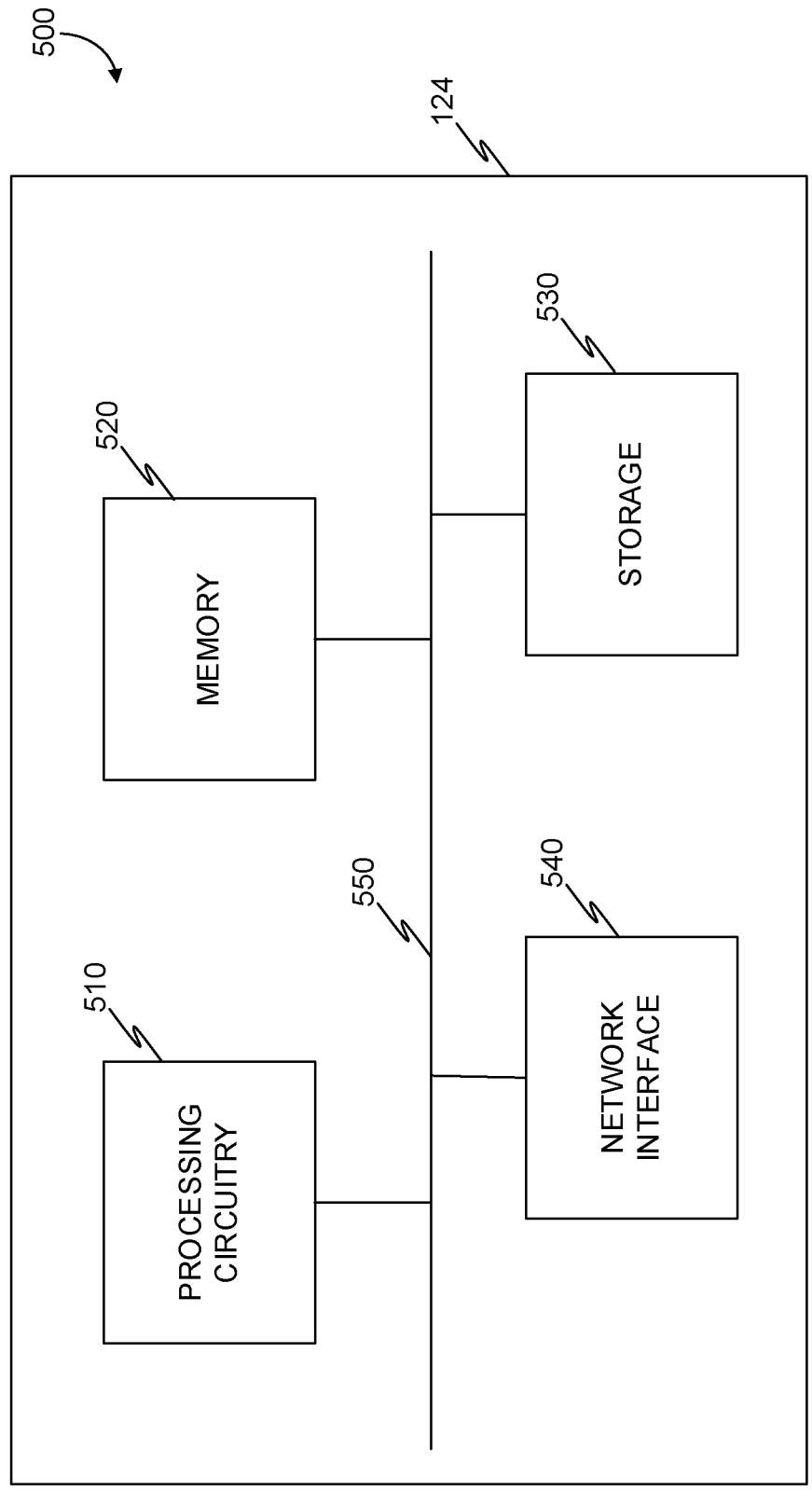
FIG. 5 is a schematic diagram of a frontend RDP server, implemented according to an embodiment.

FIG. 5 is an example schematic diagram 500 of a frontend RDP server 124, implemented according to an embodiment. The frontend RDP server 124 includes a processing circuitry 510 coupled to a memory 520, a storage 530, and a network interface 540. In an embodiment, the components of the frontend RDP server 124 may be communicatively connected via a bus 550. In other embodiments the frontend RDP server 124 may be implemented as a virtual workload, having compute resources provisioned by a cloud computing environment.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, solid state storage, and the like, and may be realized, for example, as flash memory or other memory technology, or any other medium which can be used to store the desired information.

The network interface 540 allows the frontend RDP server 124 to communicate with, for example, the client device 110, the access portal server 122, the policy engine 125, the IAM server 140, the backend server 126, the connector 123, or any combination thereof.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing a multifactor authentication (MFA) service for a remote desktop protocol (RDP) session through a zero-trust cloud environment, comprising:
    authenticating an identity of a user account, wherein a first request to connect to the zero-trust cloud environment based on at least the user account is received from a client device;
    receiving a second request from the client device to connect to a target machine having an RDP server;
    responsive to receiving the second request:
        generating an MFA challenge for the client device; and
        directing the client device to communicate with a virtual workload; and
    initiating an RDP session through the zero-trust cloud environment with the target machine based on:
    determining that the MFA challenge is successfully completed; and
    sending the client device a reconnect instruction to:
        disconnect from the virtual workload; and
        reconnect to a frontend RDP server deployed in the zero-trust cloud environment, wherein the frontend RDP server is configured to receive communication from the client device and direct the received communication to the target machine.

2. The method of claim 1, further comprising:
    capturing, through the virtual workload, login credentials for the target machine received from the client device, the target machine implemented in a secure network environment;
    authenticating the captured login credentials with the target machine; and
    initiating the RDP session further in response to determining that the captured login credentials are authenticated by the target machine.

3. The method of claim 2, wherein the virtual workload is a node in a container cluster.

4. The method of claim 2, further comprising:
    configuring the virtual workload to initiate a browser session, wherein the browser session is directed to a webpage generated by an access portal server;
    configuring the virtual workload to generate a user interface displaying at least the MFA challenge; and
    receiving from the client device a response to the MFA challenge.

5. The method of claim 1, further comprising:
    querying a policy engine based on the user account; and
    generating the MFA challenge further based on a policy of the policy engine.

6. The method of claim 1, further comprising:
    generating the MFA challenge further based on receiving the MFA challenge from an identity and authentication management (IAM) server.

7. The method of claim 6, wherein the IAM server is any one of: implemented within the zero-trust cloud environment, and implemented externally to the zero-trust cloud environment.

8. The method of claim 6, further comprising:
    generating the MFA challenge further based on sending a request for the MFA challenge from any one of: the frontend RDP server, an access portal server, and the virtual workload.

9. The method of claim 1, further comprising:
    generating the MFA challenge based on any one of: a security token, a bank card, a key card, a password, a personal identification number (PIN), a biometric signature, a fingerprint, a voice print, and a location of the user device.

10. The method of claim 1, further comprising:
    authenticating the identity of the user account based on login credentials for the user account and a second form of identification.

11. The method of claim 1, further comprising:
    responsive to a predetermined time elapsing for the RDP session, generating a second MFA challenge for the client device.

12. A non-transitory computer readable medium having stored thereon instructions for causing a processing circuitry to execute a process, the process comprising:
- authenticating an identity of a user account, wherein a first request to connect to the zero-trust cloud environment based on at least the user account is received from a client device;
- receiving a second request from the client device to connect to a target machine having an RDP server;
- responsive to receiving the second request;
  - generating an MFA challenge for the client device; and
  - directing the client device to communicate with a virtual workload; and
- initiating an RDP session through the zero-trust cloud environment with the target machine based on:
- determining that the MFA challenge is successfully completed; and
- sending the client device a reconnect instruction to:
  - disconnect from the virtual workload; and
  - reconnect to a frontend RDP server deployed in the zero-trust cloud environment, wherein the frontend RDP server is configured to receive communication from the client device and direct the received communication to the target machine.

13. A system for providing an MFA service for a remote desktop protocol (RDP) session through a zero-trust cloud environment, comprising:
- a processing circuitry; and
- a memory, the memory containing instructions that, when executed by the processing circuitry, configure the system to:
- authenticate an identity of a user account, wherein a first request to connect to the zero-trust cloud environment based on at least the user account is received from a client device;
- receive a second request from the client device to connect to a target machine having an RDP server;
- responsive to receiving the second request:
  - generate an MFA challenge for the client device; and
  - direct the client device to communicate with a virtual workload; and
- initiate an RDP session through the zero-trust cloud environment with the target machine based on:
  - determining that the MFA challenge is successfully completed; and
  - sending the client device a reconnect instruction to:
    - disconnect from the virtual workload; and
    - reconnect to a frontend RDP server deployed in the zero-trust cloud environment, wherein the frontend RDP server is configured to receive communication from the client device and direct the received communication to the target machine.

14. The system of claim 13, wherein the memory further contains instructions that when executed by the processing circuitry further configure the system to:
- capture, through the virtual workload, login credentials for the target machine received from the client device, the target machine implemented in a secure network environment;
- authenticate the captured login credentials with the target machine; and
- initiate the RDP session further in response to determining that the captured login credentials are authenticated by the target machine.

15. The system of claim 14, wherein the virtual workload is a node in a container cluster.

16. The system of claim 14, wherein the memory further contains instructions that when executed by the processing circuitry further configure the system to:
- configure the virtual workload to initiate a browser session, wherein the browser session is directed to a webpage generated by an access portal server;
- configure the virtual workload to generate a user interface displaying at least the MFA challenge; and
- receive from the client device a response to the MFA challenge.

17. The system of claim 13, wherein the memory further contains instructions that when executed by the processing circuitry further configure the system to:
- query a policy engine based on the user account; and
- generate the MFA challenge further based on a policy of the policy engine.

18. The system of claim 13, wherein the memory further contains instructions that when executed by the processing circuitry further configure the system to:
- generate the MFA challenge further based on receiving the MFA challenge from an identity and authentication management (IAM) server.

19. The system of claim 18, wherein the IAM server is any one of: implemented within the zero-trust cloud environment, and implemented externally to the zero-trust cloud environment.

* * * * *